May 13, 1930.                  C. SCHMITZ                  1,758,586
                                SEPARATOR
                            Filed Oct. 18, 1929

*Carl Schmitz*
INVENTOR.

BY *Erich J. Michaelis*
ATTORNEYS.

Patented May 13, 1930

1,758,586

UNITED STATES PATENT OFFICE

CARL SCHMITZ, OF OELDE, GERMANY

SEPARATOR

Application filed October 18, 1929, Serial No. 400,482, and in Germany September 26, 1927.

The invention relates to separators and more especially to that type of separators, used for separating cream from milk.

In this type of separators the material to be treated, is introduced into the separator drum in the well known manner and by means of rotation of the drum the heavier material, that is the skimmed milk, will be forced toward the circumference of the drum, while the lighter material, that is the cream, will be pressed toward the center of the drum, where it will rise and escape through the openings provided therefore.

In this type of separators the difference between the escape openings for the lighter and heavier materials must be greater measured in radial direction than it would seem necessary according to the difference between the specific gravities in order to provide space for the arrangement of regulating screws by means of which either the escape of the lighter or the heavier or of both materials may be controlled.

In order to drive the lighter material, that is the cream, up to a controllable dimension toward the center, the return chamber for the heavier material is constructed so, that the movement of the heavier matter will be accelerated whereby a reacting pressure is created, which will influence the amount of material entering the drum to be separated.

It happens frequently, that different liquids shall be treated in the same drum one after the other, for instance milk and whey. The quantity of whey to be treated may be considerably increased in comparison with milk, since the whey is easier separated from the cream and since the whey contains less fat. The production of whey depends practically only on the capacity of the drum.

Figure 1:
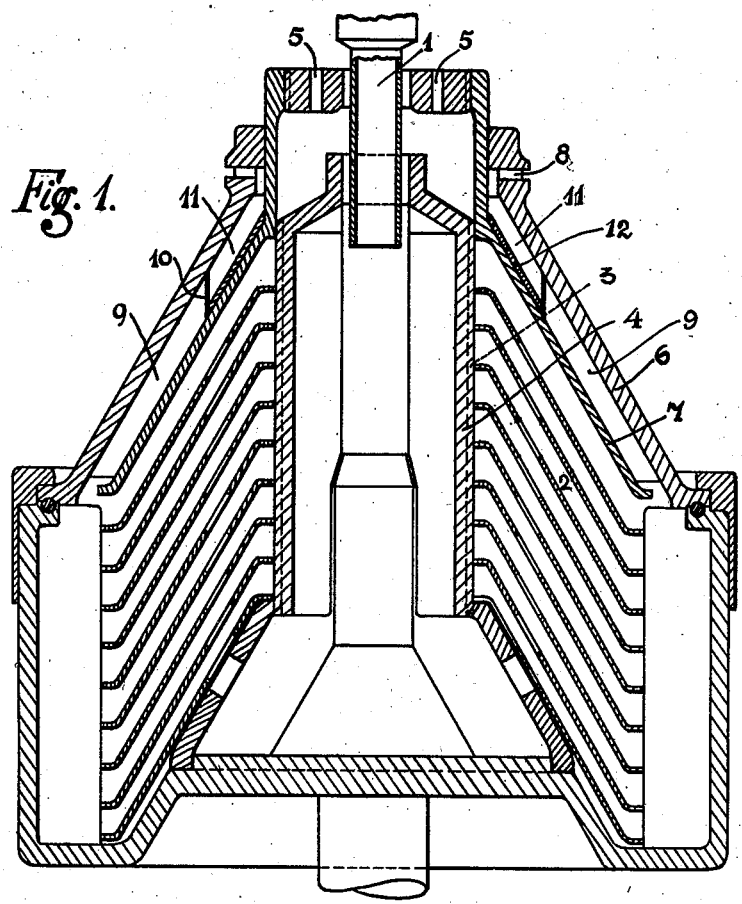
Figure 2:
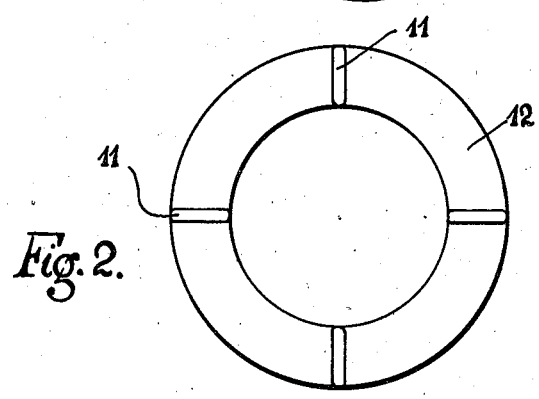
Figure 3:
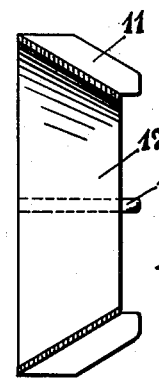

In order to equalize the radial pressures of the liquids to be separated, a clear circular space is provided adjacent the separating zone, as is indicated in the drawings, in which Fig. 1 is a diagrammatical, sectional view of a separator, Fig. 2 a member adapted to be inserted in a clear circular space provided in the drum adjacent the separating zone thereof and Fig. 3 a section through said member.

The object of the invention is to provide an additional member, adapted to be inserted in the clear circular space, so that the centrifugal speed of the heavier material may be regulated by inserting or omitting the said member.

Other objects of the invention not specifically mentioned may be easily ascertained and understood from the following description on hand of the accompanying drawings forming a part thereof. It is however to be noted, that the invention is not to be limited or restricted to the exact construction or formation shown in the drawings and described in the specification, but that the invention is only to be limited by the scope of the claims appended hereto.

The milk to be treated in the sparator enters in well known manner at 1 into the drum and is separated in the disk space 2. The lighter portion of the milk, that is the cream, flows inwardly and rises in grooves 3 in the center tube 4 upwardly, in order to escape through the adjustable openings 5. The heavier portion forces its way towards the circumference of the drum and flows through the conical space between the drum cover 6 and the upper conical disk 7 inwardly to the exit 8. Ribs 9 on the cover 6 force the material in the space between the cover and the upper disk to follow the rotation of the drum and serve at the same time as guides for said material in its upward flow. As shown in the drawings, said ribs do not extend all the way to the upward end of the cover, so that between said cover and the upper disk a clear circular space remains.

Any material passing through the space between the cover and the upper disk will leave the end 10 of the rib 9 with the same speed with which this end 10 rotates and since the material at the same time will flow further toward the center, this material will receive inside the clear circular space a greater angular celerity than the rest of the material moving in the drum. In consequence it will also exert an increased centrifugal pressure, which will equalize the pressure of the casein of the lighter liquid, extending toward the center and ending at the escape openings 3.

The effect of the clear circular space may be eliminated when the drum is to be used for the purpose of separating wheys from cream, because it will be unnecessary in that case to use an increased angular celerity of the heavier material to equalize the pressure of the casein of the lighter liquid, since the difference between the specific gravities of the two materials is so much greater than by the separation of cream and milk.

To eliminate the clear space above the ribs 9, ribs 11 are provided, which in fact form a continuation of the ribs 9. The additional ribs 11 may be connected with each other by means of a conical ring 12, adapted to fit onto the upper portion of the top disk 7. When the ring 12 is put in position as shown in the drawings the whey flowing through the space between the drum cover 6 and the upper disk 7 will follow the ribs 9 and the ribs 11 up to the exit openings 8 and will not receive the increased angular celerity, which it would receive, if the ribs 11 would not be provided.

When the ribs 11 are provided the radial difference between the escape openings will be equalized by means of an increased output.

It shall be mentioned here, that the adjustable control screws 5 are not affected by the addition of the ring 12 with the ribs 11, but that these adjustable screws will have to be provided anyhow.

Having described my invention and how the same is to be performed, I claim as new and desire to secure by Letters Patent:

1. In a separator of the class described having a conical drum cover and a conical top disk forming a conical space with said top, a plurality of ribs extending between the two members and ending at a distance from the upper end of the space between the two members and a plurality of additional ribs adapted to be inserted into the space between the two members and to form a continuation of the first mentioned ribs.

2. In a separator of the class described, a conical upper disk, a conical drum cover arranged at a distance from said disk, a plurality of ribs extending between the two members and ending short of the upper end of said members, a conical ring adapted to be inserted into the space between the top and the disk, to rest on said disk above the upper end of said ribs and a plurality of other ribs on said ring extending up to the drum cover and adapted to form continuations of the first mentioned ribs.

In witness whereof I affix my signature.

CARL SCHMITZ.